July 27, 1943.  A. DE RENTIIS  2,325,046
SPINNING AND TORQUE MEASURING MACHINE
Filed Sept. 13, 1940  4 Sheets-Sheet 2

Inventor
Augusto DeRentiis
By
Attorneys

July 27, 1943.　　　A. DE RENTIIS　　　2,325,046
SPINNING AND TORQUE MEASURING MACHINE
Filed Sept. 13, 1940　　　4 Sheets-Sheet 3
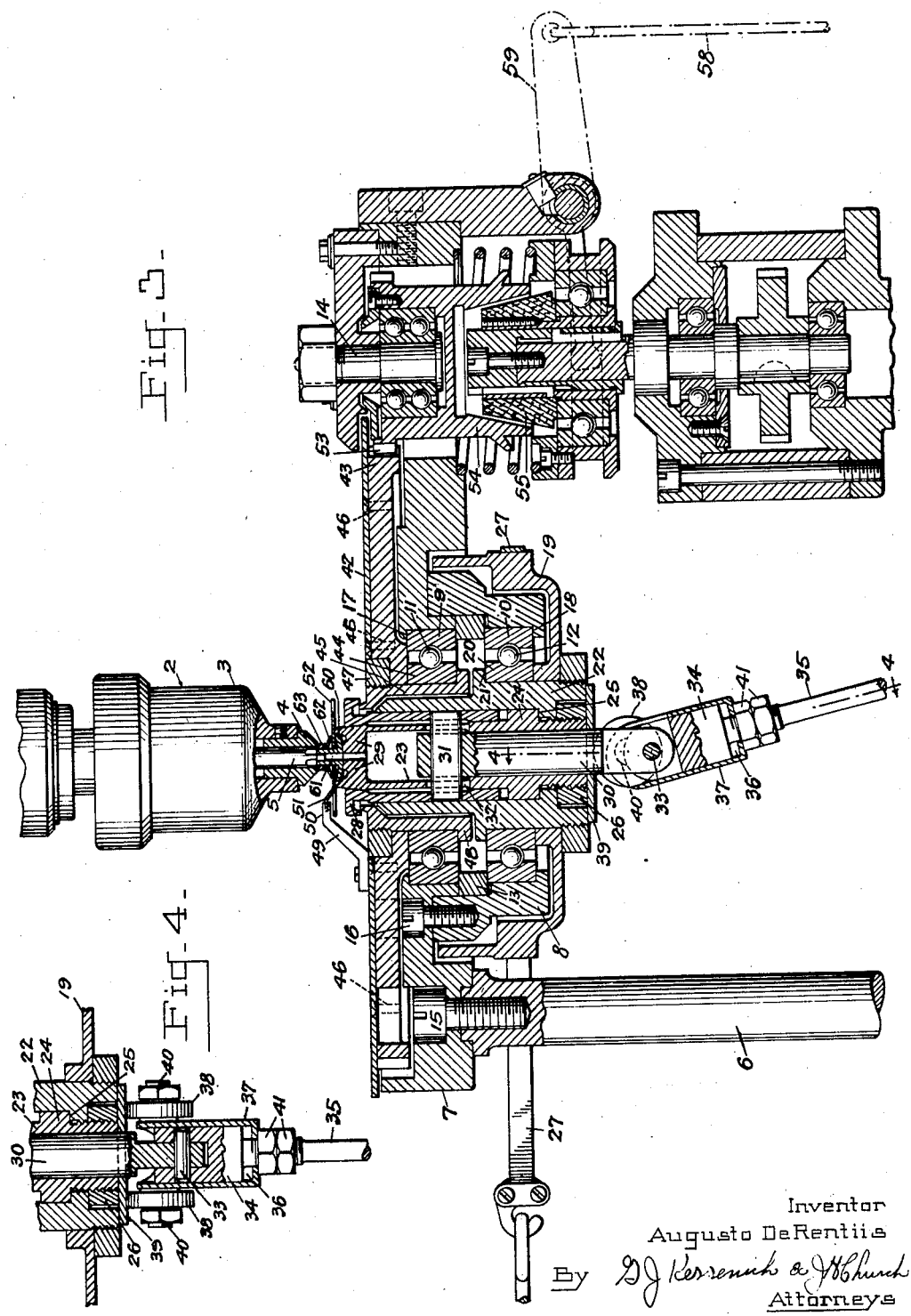
Inventor
Augusto DeRentiis
By
Attorneys July 27, 1943.  A. DE RENTIIS  2,325,046
SPINNING AND TORQUE MEASURING MACHINE
Filed Sept. 13, 1940  4 Sheets-Sheet 4
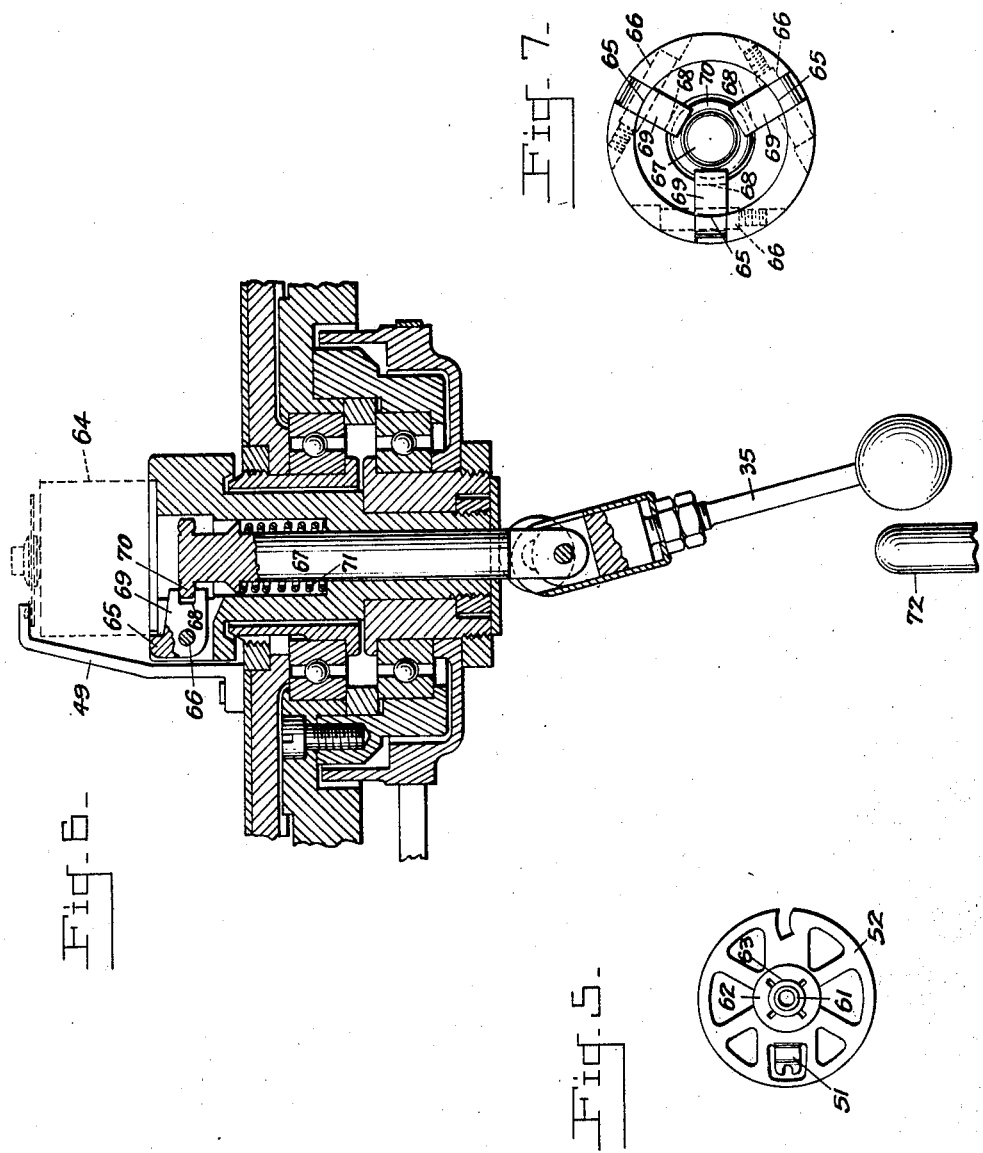
Inventor
Augusto DeRentiis
By [signature]
Attorneys Patented July 27, 1943

2,325,046

UNITED STATES PATENT OFFICE 2,325,046

SPINNING AND TORQUE MEASURING MACHINE

Augusto De Rentiis, Prospect Park, Pa.

Application September 13, 1940, Serial No. 356,628

2 Claims. (Cl. 265—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the manufacture of parts for clockwork fuses, particularly the timing disk and its friction regulating spring. The type of timing disk, as shown for instance in U. S. Patent No. 1,990,034 is attached to a clockwork spindle in frictional engagement therewith, the friction being furnished by a cup-shaped spring washer. For setting, the disk is turned against the friction and in operation is carried thereby. The magnitude and constancy of this frictional force is important in the proper functioning of a fuse and the present invention is concerned with a means of regulating the same during manufacture.

The present invention relates to a torque measuring device for checking the frictional pressure between parts of the timing disk unit.

It is therefore an object of this invention to provide a means for measuring the friction between friction-coupled units without removing them from the machine by which they are assembled.

This and other objects of the invention will appear from the following description and the accompanying drawings in which:

Figure 3 is a sectional view taken along the line 3—3 of Figure 2;

Figure 4 is a sectional view taken along the line 4—4 of Figure 3;

Figure 5 is a top plan view of a timing disk;

Figure 6 is a section in elevation showing a modification of a part in Figure 3, and Figure 7 is a top plan view of a detail of Figure 6.

Figure 1:
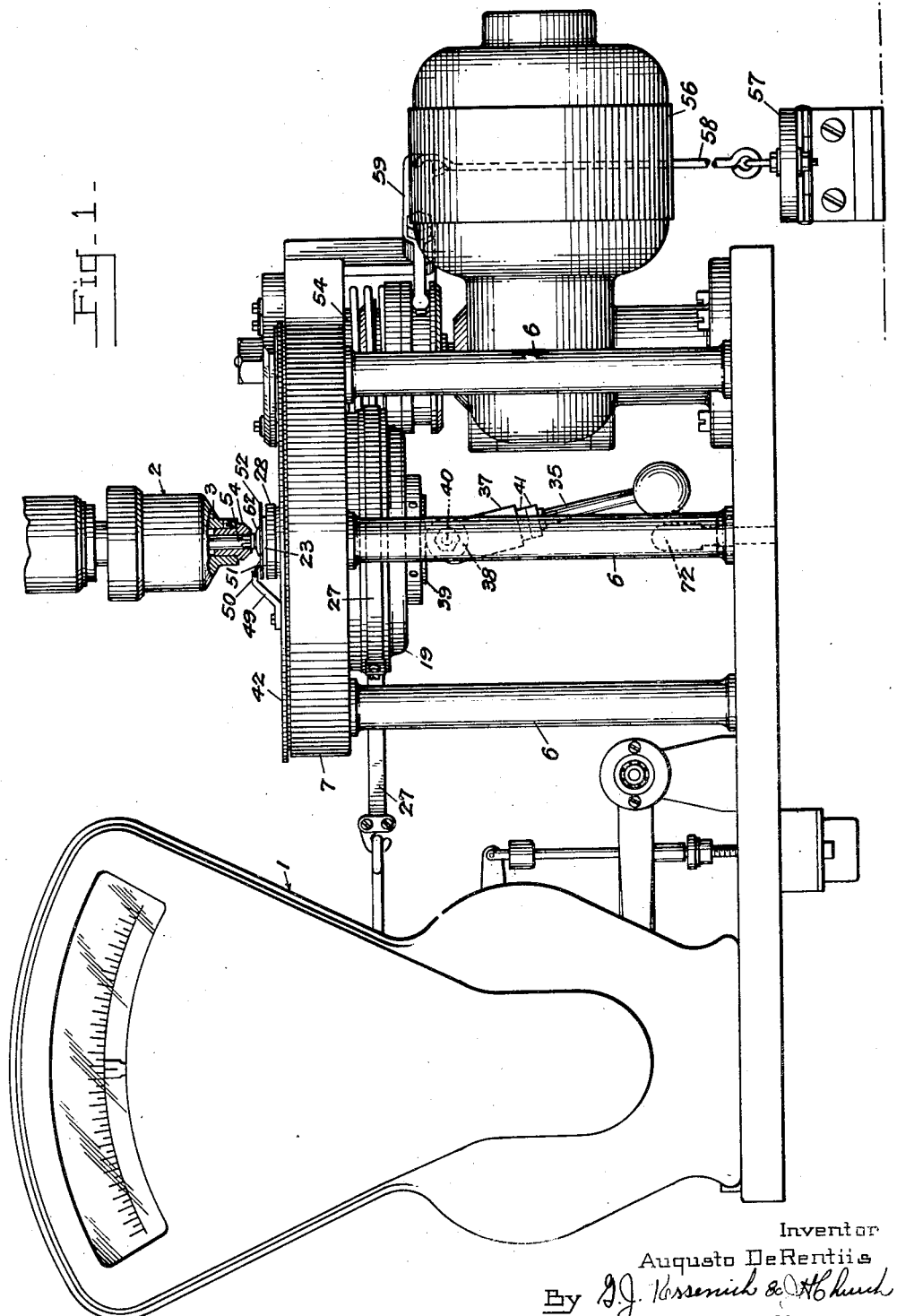
Figure 1 is a front elevation of the general layout of machinery including the lower portion of the spinning tool, the chuck, the torque registering device and an auxiliary motor for torque measuring purposes.
Figure 2:
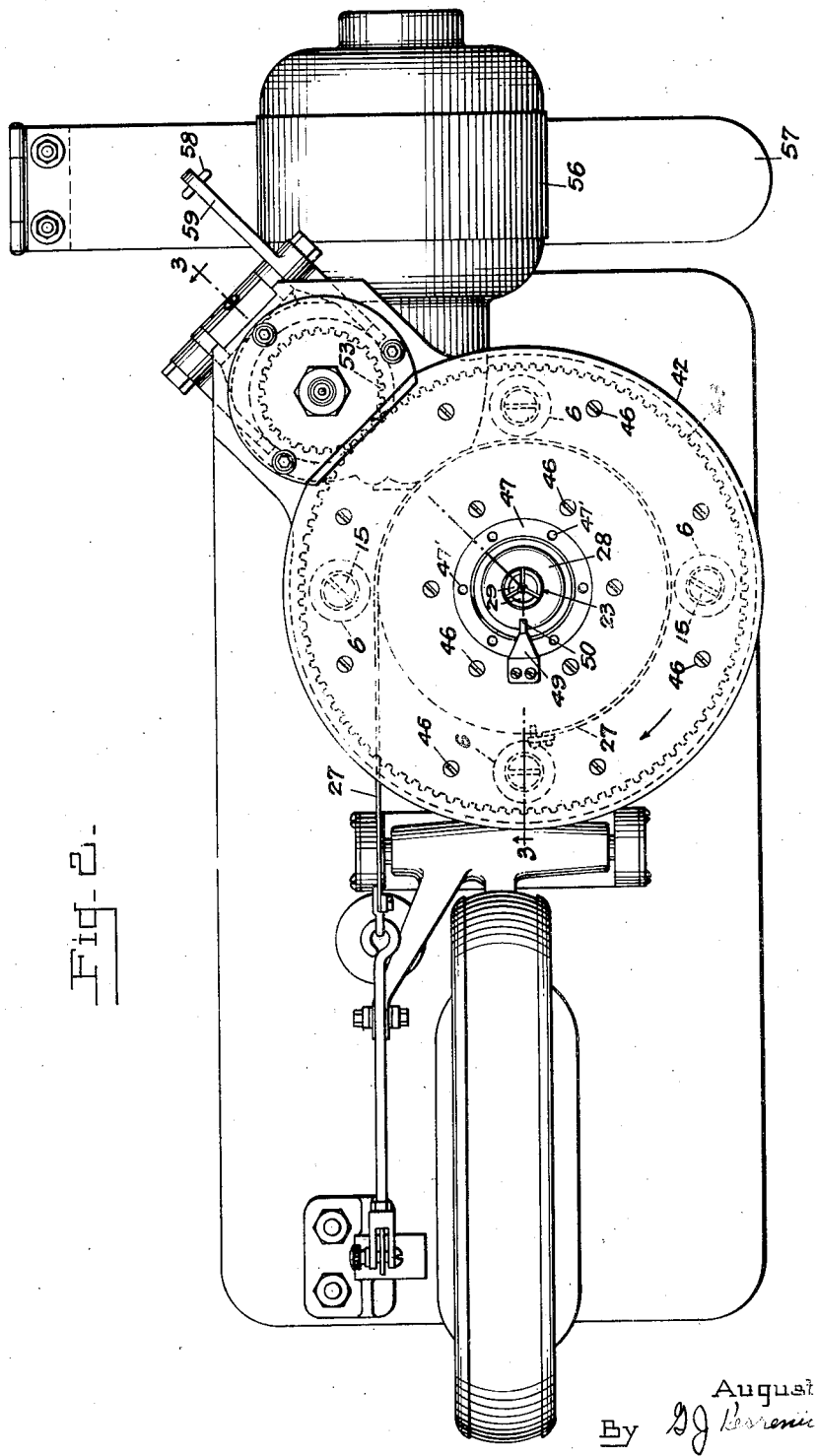
Figure 2 is a top plan view of the assembly of Figure 1.

Referring to the drawings by characters of reference, I shows generally a torque measuring device which may be any of the types of scale in common use. The spinning unit is shown generally at 2 and comprises an outer housing 3 having a bushing 4. The housing 3 and bushing 4 are movable axially of the spinning tool 5 against the pressure of a spring (not shown).

Referring to Figure 3, based on uprights 6 is a system comprising a stationary unit and two separately rotatable units located generally above and generally below the stationary unit, respectively. Included in the stationary unit are plate 7, ring 8, outer races 9, 10 for the ball bearings, 11, 12 and a spacer ring 13 for the races. Also fixed to the stationary unit is the shaft 14 of a clutch assembly presently to be described. Plate 7 is attached to upright 6 by means of bolts 15 and ring 8 is held to plate 7 by means of bolts 16. The races 9, 10 and spacer ring 13 are retained between shoulders 17, 18 on plate 7 and ring 8, respectively.

The lower rotatable unit is supported by bearings 12. Drum 19, together with the inner race 20, is fastened against the shoulder 21 of a sleeve 22. Collet 23, engaging sleeve 22 on an extended diameter 24, is also fastened against a shoulder 25 of sleeve 22 by means of nut 26. The drum 19 is connected to scale 1 by means of a strap 27. Thus, through direct connections, the scale is responsive to rotation of the collet.

Adapter 28 closes the jaws 29 of collet 23 when the downward motion of pin 30 is transmitted to adapter 28 by means of key 31. Key 31 passes through slot 32 in collet 23 which slot is of sufficient length to permit free movement up and down of key 31.

Pin 30, pivoted at 33 to piston-like end 34 of handle 35, said end being fitted in a bore 36 of a housing 37, is urged downward by action of rollers 38 acting against washer 39. Shafts 40 on housing 37 on which rollers 38 revolve are located eccentrically to the central axis of the housing 37 so that rollers 38 are brought to bear against washer 39 as the handle 35 is swung. Adjustment of rollers 38 for engagement with washer 39 is made by nuts 41. Since rollers 38 are mounted on housing 37, the latter is urged downward when handle 35 is swung. Stop nuts 41, however, intercept this downward movement and a tension is transmitted through member 34 to draw pin 30 down, and hence the adapter.

The upper rotatable unit is supported on bearings 11. It consists of a circular plate 42, gear 43, inner bearing race 44 and hub 45. Plate 42 is fastened to gear 43 by screws 46 and gear 43, race 44 and hub 45 are held together by pressure of ring nut 47. Nut 47 is fastened through spanner holes 47'. Gear 43 and race 44 are held between nut 47 and flange 48 of hub 45. On plate 42 is fixed a stop 49. The end 50 of this stop is at a suitable elevation above plate 42 for intercepting the spring finger 51 of the timing disk 52.

The upper rotatable unit can be put into motion by pinion 53 fixed to the upper portion 54 of a cone clutch. The lower portion 55 of the clutch is powered by auxiliary motor 56 and is brought into engagement with the upper portion 54 by treadle 57 acting through tie rod 58 and lever 59. Since the clutch may be of any known type it will not be described here in further detail.

The timing disk 52 is mounted against the flange 60 of a sleeve 61 and held in position by a Belleville spring 62. Spring 62 is held under proper tension by a ring washer 63 over which the upper end of the sleeve 61 is spun. Sleeve 61 is designed for rotation with the main shaft of a clockwork, while timing disk 52 is rotatable under friction relative to sleeve 61 for setting purposes.

To check the friction pressure between the timing disk 52 and spring 62, the spinning tool is raised and the clutch parts 54, 55 engaged by pressing on treadle 57. Pinion 53 turns gear 43 and the entire upper rotatable unit. Stop 49 carries with it the timing disk 52 by engaging the finger 51 thereof. Due to its frictional engagement, disk 52 carries with it the sleeve 61 and hence the entire rotatable unit, and moves the pointer of scale 1, until the back force in scale 1 equals the friction between timing disk 52 and sleeve 61. When these opposing forces are in equilibrium, the sleeve 61 will be held by the back force in the scale and the timing disk, under the urging of member 50 will continue to rotate around the sleeve 61. Allowing for friction in the rotating parts of the machine, the reading of the scale 1 will give the friction between timing disk 52 and sleeve 61.

In Figure 6 is shown a modification of the collet which is used when the timing disk assembly is spun directly to the clockwork shaft. The entire clockwork assembly is shown at 64 in dotted lines. Jaws 65 turning on pivots 66 are urged into holding position by the downward motion of pin 67 engaging in slots 68 of the lower arms 69 of jaws 65 by means of flange 70. Spring 71 aids in releasing the jaws. 72 is a central stop for handle 35. Stop 49 will, of course, extend to a greater height in this modification.

I claim:

1. A force measuring device comprising a fixed annular table having a flanged, inner periphery, a drum having an annular channel surrounding the flange of said table and journalled within the same, a work-holding member carried by said drum and extending through the central opening in said table, a rotatably mounted table on the side of said table opposite from said drum and journalled in the inner periphery of said table, an arm on said rotatably mounted table positioned for engagement with a portion of the work in the work-holding member, a driving member including a clutch and a driving connection between said driving member and said rotatably mounted table, a load-indicating device and a connection between the load-indicating device and the periphery of said drum.

2. A force measuring device comprising a fixed annular table, a rotatably mounted member on one side of said table, journalled therein and carrying a work-gripping element extending through the center thereof, a second rotatably mounted member on the other side of said table, journalled therein and carrying an arm for engagement with a portion of the workpiece in the work-gripping element whereby relative motion between portions of the workpiece may be occasioned by relative motion between said rotatably mounted members, means for said second rotatably mounted member including a clutch, a load-indicating device and connecting means between said load-indicating device and the first-mentioned rotatably mounted member.

AUGUSTO DE RENTIIS.